US012374019B2

(12) United States Patent
Yoon et al.

(10) Patent No.: US 12,374,019 B2
(45) Date of Patent: Jul. 29, 2025

(54) MULTICHIP RAY TRACING DEVICE AND METHOD

(71) Applicant: SiliconArts Technology US Inc., Waco, TX (US)

(72) Inventors: Hyung Min Yoon, Seoul (KR); Byoung Ok Thi Lee, Seongnam-si (KR); Hyuck Joo Kwon, Seoul (KR)

(73) Assignee: SiliconArts Technology US Inc.

( * ) Notice: Subject to any disclaimer, the term of this patent is extended or adjusted under 35 U.S.C. 154(b) by 158 days.

(21) Appl. No.: 17/994,935

(22) Filed: Nov. 28, 2022

(65) Prior Publication Data

US 2023/0169713 A1 Jun. 1, 2023

(30) Foreign Application Priority Data

Nov. 30, 2021 (KR) ........................ 10-2021-0169128

(51) Int. Cl.
*G06T 15/00* (2011.01)
*G06T 15/06* (2011.01)

(52) U.S. Cl.
CPC ............ *G06T 15/005* (2013.01); *G06T 15/06* (2013.01)

(58) Field of Classification Search
CPC ....... G06T 15/005; G06T 15/06; G06T 15/80; G06T 1/20; G06T 1/60; G06F 3/147
See application file for complete search history.

(56) References Cited

U.S. PATENT DOCUMENTS

| 2012/0050289 A1* | 3/2012 | Park ...................... G06T 17/005 |
| | | 345/426 |
| 2016/0027203 A1* | 1/2016 | Lee ........................ G06T 15/06 |
| | | 345/423 |
| 2016/0239994 A1* | 8/2016 | Chung ................... G06T 15/06 |

(Continued)

FOREIGN PATENT DOCUMENTS

| KR | 10-0300969 B1 | 10/2001 | |
| KR | 101807172 B1 * | 12/2017 | ........... G06T 17/005 |

OTHER PUBLICATIONS

Office Action for KR 10-2021-0169128 by Korean Intellectual Property Office dated Sep. 2, 2024.

(Continued)

*Primary Examiner* — Ryan R Yang
(74) *Attorney, Agent, or Firm* — BROADVIEW IP LAW, PC

(57) ABSTRACT

There is provided a multichip ray tracing device. The multichip ray tracing device includes a plurality of memory units; an acceleration structure division processing unit that divides an acceleration structure (AS) into a plurality of divided acceleration structures and stores each of the plurality of divided acceleration structures in a corresponding memory unit among the plurality of memory units; and a plurality of ray tracing core units connected to the plurality of memory units. Each of the plurality of ray tracing core units performs an internal ray tracing (Internal RT) operation for a corresponding divided acceleration structure and transmits corresponding ray information to a corresponding ray tracing core unit to perform an external ray tracing (External RT) operation when attempting to access a data node that is not in the corresponding divided acceleration structure in the process of the internal ray tracing operation.

7 Claims, 8 Drawing Sheets

(56) References Cited

U.S. PATENT DOCUMENTS

2020/0327716 A1* 10/2020 Yoon ..................... G06F 13/122
2021/0097750 A1   4/2021 Woop et al.
2022/0244962 A1*  8/2022 Eltantawy ............. G06F 9/3888
2023/0419587 A1* 12/2023 Park ......................... G06T 1/60

OTHER PUBLICATIONS

Extended European Search Report for EP 22210220.4 by European Patent Office dated May 5, 2023.

* cited by examiner

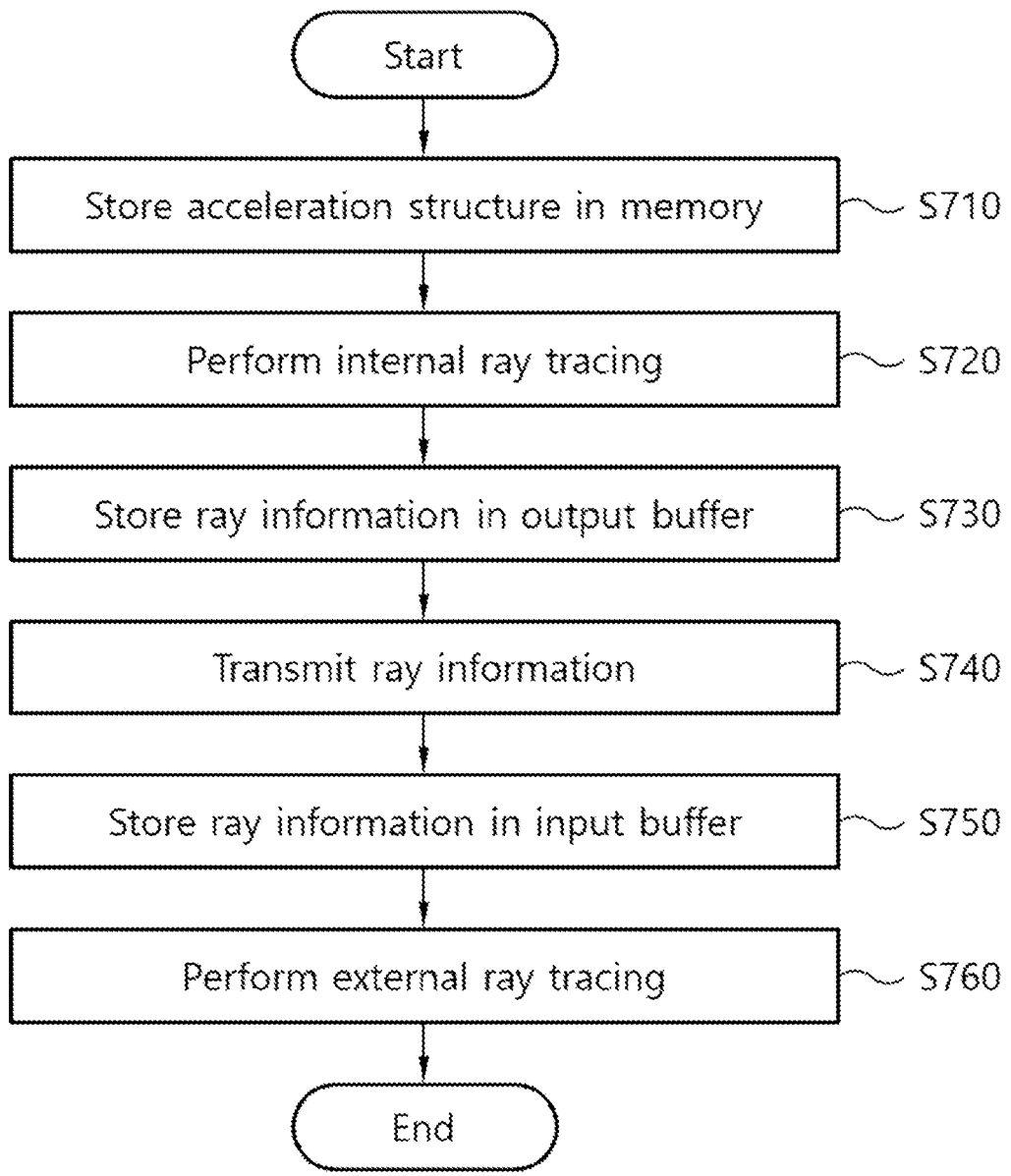

MULTICHIP RAY TRACING DEVICE AND METHOD

CROSS-REFERENCE TO RELATED APPLICATION

This application claims priority to Korean Patent Application No. 10-2021-0169128 filed on Nov. 30, 2021, which is hereby incorporated by reference in its entirety.

BACKGROUND

The present disclosure relates to a technology for processing three-dimensional (3D) graphics and, more specifically, relates to a multichip ray tracing device and method in which acceleration structures for a traversal & intersection test (T&I) operation can be effectively shared among multiple chips in the process of performing ray tracing on a 3D scene.

The technology for processing 3D graphics may fall under a graphic technology using a 3D representation of geometric data stored in a computing device and has recently been widely used in various industries such as the media industry and the game industry.

Through a ray tracing technology, realistic graphics for a 3D scene can be realized by effectively simulating various optical effects including reflection, refraction, and shadows.

In particular, the ray tracing technology may include a traversal of an acceleration structure for a 3D scene, an intersection test between ray-primitives, etc. and may require a large amount of computation and a wide memory bandwidth as many processes are repeatedly performed for each scene.

PATENT DOCUMENT

Korean Patent No. 10-0300969 (Jun. 21, 2001)

SUMMARY

According to one embodiment of the present disclosure, there is provided a multichip ray tracing device and method in which acceleration structures for a traversal & intersection test (T&I) operation can be effectively shared among multiple chips in the process of performing ray tracing on a 3D scene.

According to one embodiment of the present disclosure, the multichip ray tracing device includes a plurality of memory units; an acceleration structure division processing unit that divides an acceleration structure (AS) into a plurality of divided acceleration structures and stores each of the plurality of divided acceleration structures in a corresponding memory unit among the plurality of memory units; and a plurality of ray tracing core units connected to the plurality of memory units, wherein each of the plurality of ray tracing core units performs an internal ray tracing (Internal RT) operation for a corresponding divided acceleration structure and transmits corresponding ray information to a corresponding ray tracing core unit to perform an external ray tracing (External RT) operation when attempting to access a data node that is not in the corresponding divided acceleration structure in the process of the internal ray tracing operation.

Each of the plurality of ray tracing core units may include a ray tracing core that processes the internal ray tracing operation and a ray output buffer that stores the corresponding ray information in the process of the internal ray tracing operation.

Each of the plurality of ray tracing core units may further include a ray input buffer for storing the corresponding ray information received from the corresponding ray tracing core unit in the process of the external ray tracing operation.

Each of the plurality of ray tracing core units may further include a data transfer unit that reads the corresponding ray information from the ray output buffer and transmits it to the ray input buffer in the corresponding ray tracing core unit for the process of the external ray tracing operation.

Each of the plurality of ray tracing core units may be exclusively connected to one of the plurality of memory units and wait to see whether the external ray tracing operation is completed when the corresponding ray information is transmitted to the corresponding ray tracing core unit.

Each of the plurality of ray tracing core units may continue the internal ray tracing operation when the external ray tracing operation is completed.

The acceleration structure division processing unit may determine a workload rate of each of the plurality of ray tracing core units and divide the acceleration structure based on the workload rate while sharing at least a root data node.

According to one embodiment of the present disclosure, a method for multichip ray tracing includes the step of preparing the plurality of memory units; the step of processing the division of the acceleration structure, wherein the acceleration structure (AS) is divided into the plurality of divided acceleration structures and each of the plurality of divided acceleration structures is stored in a corresponding memory unit among the plurality of memory units; and the step of ray tracing performed by the plurality of ray tracing core units connected to the plurality of memory units, wherein each of the plurality of ray tracing core units performs the internal ray tracing (Internal RT) operation for a corresponding divided acceleration structure and transmits corresponding ray information to a corresponding ray tracing core unit to perform the external ray tracing (External RT) operation when attempting to access a data node that is not in the corresponding divided acceleration structure in the process of the internal ray tracing operation.

The disclosed art may have the following effects. However, it does not mean that a specific embodiment should include all of the following effects or only the following effects, so the scope of the disclosed art should not be deemed to be limited thereto.

In the multichip ray tracing device and method according to one embodiment of the present disclosure, the acceleration structures for a traversal & intersection test (T&I) operation can be effectively shared among the multiple chips in the process of performing the ray tracing on a 3D scene.

In the multichip ray tracing device and method according to one embodiment of the present disclosure, it is possible that the ray tracing for all the acceleration structures is completed with ray information exchanged between the chips while the divided acceleration structures are distributed to the multiple chips so that the ray tracing is independently performed in each chip.

BRIEF DESCRIPTION OF THE DRAWINGS

FIG. 7 is a flowchart illustrating a method for multichip ray tracing according to the present disclosure.

DETAILED DESCRIPTION

Figure 1:
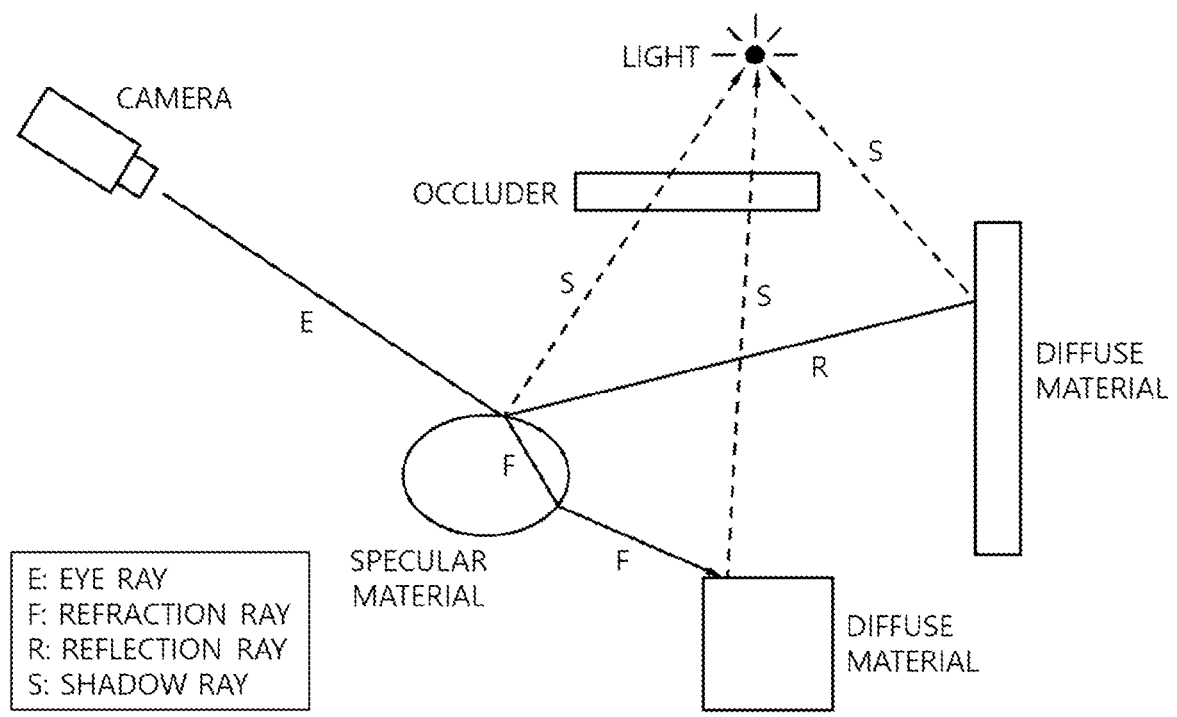
FIGS. 1 and 2 are diagrams illustrating the process of ray tracing performed by a multichip ray tracing device according to one embodiment of the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

Figure 2:
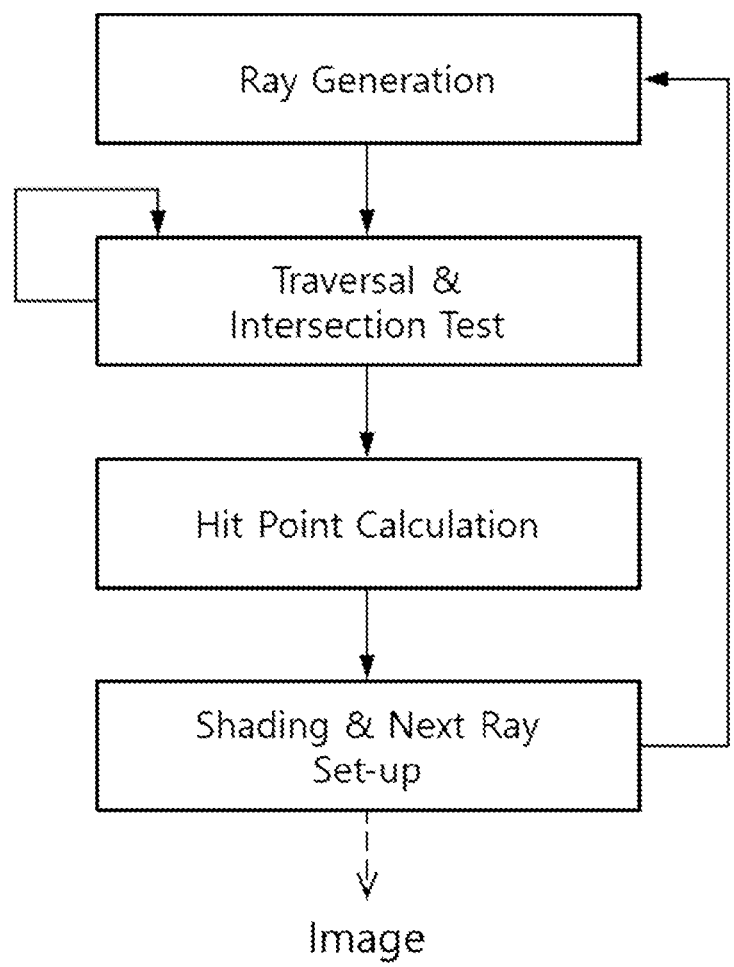

FIGS. 1 and 2 are diagrams illustrating the process of ray tracing performed by a multichip ray tracing device according to one embodiment of the present disclosure.

Referring to FIG. 1, an initial ray EYE RAY (E) may be generated from the position of a camera for each pixel, and a calculation may be performed to find an object encountered by the ray E. When the object encountered by the ray E is a refraction object SPECULAR MATERIAL or a reflective object DIFFUSE MATERIAL, a refraction ray F for a refractive effect and/or a reflection ray R for a reflective effect may be generated in the position where the ray E encounters the object, and a shadow ray S may be generated in the direction of light. In an embodiment, a shadow may be generated at the point where the shadow ray S has been generated when the shadow ray S encounters other object OCCLUDER.

Referring to FIG. 2, the process of ray tracing may be performed recursively and may include (i) the eye ray generation step 210, (ii) the traversal of acceleration structure (AS) step, (iii) the intersection test step, (iv) the shading step, and (v) the texture mapping step.

In the eye ray generation step, at least one ray may be generated based on eye ray generation information and shading information. The eye ray generation information may include a screen coordinate value for generating the eye ray, and the shading information may include a ray index for obtaining a screen coordinate value; a coordinate value and a color value of a ray-triangle hit point; and a type of shading ray. In addition, the shading information may include additional information depending on a type of shading ray.

Here, the shading ray may include the shadow ray S, a secondary ray, or a NULL ray, and the secondary ray may include the refraction ray F and/or the reflection ray R. The refraction ray F may include the refractive index of the ray-triangle hit point as additional information, and the reflection ray R may include the reflectance of the ray-triangle hit point as additional information.

In the traversal of acceleration structure (AS) step, a leaf node intersecting a ray can be found by searching for nodes in the AS. Here, the AS may correspond to a K-dimensional tree (kd-tree), and the traversal process of the AS may correspond to a traversal of the kd-tree.

In the intersection test step, which may correspond to the ray-triangle intersection test step, a triangle list included in a leaf node intersecting a ray may be read and an intersection test for the given ray based on the coordinate information of the triangle list may be performed. In the shading step, a color value of the ray-triangle hit point may be calculated, and the shading information including a coordinate value and a color value of the ray-triangle hit point and a type of shading ray may be transferred to the next step. In the texture mapping step, an image for the current frame may be generated through texture mapping.

In the process of ray tracing, since the image for the current frame may contain both static and dynamic objects, the ray-triangle intersection test may be performed for each of static and dynamic acceleration structures, and ray tracing may be performed based on an acceleration structure that has a triangle intersecting a ray among the static and dynamic acceleration structures. In the process of ray tracing, when both of the static and dynamic acceleration structures have a triangle intersecting a ray, an acceleration structure for ray tracing may be determined based on distances between the viewpoint of the ray and each of the intersecting triangles.

That is, since a triangle with a shorter distance may be an object that is closer to an observer, a triangle having a shorter distance among the distances between the viewpoint of the ray and each of the intersecting triangles may be selected. For example, if the distance between the viewpoint of an eye and the intersecting triangle of the static acceleration structure corresponds to S1 and the distance between the viewpoint of the eye and the intersecting triangle of the dynamic acceleration structure corresponds to S2, the ray tracing may be performed based on the intersecting triangle of the static acceleration structure when S1 is smaller than S2 and may be performed based on the intersecting triangle of the dynamic acceleration structure when S2 is smaller than S1.

Figure 3:
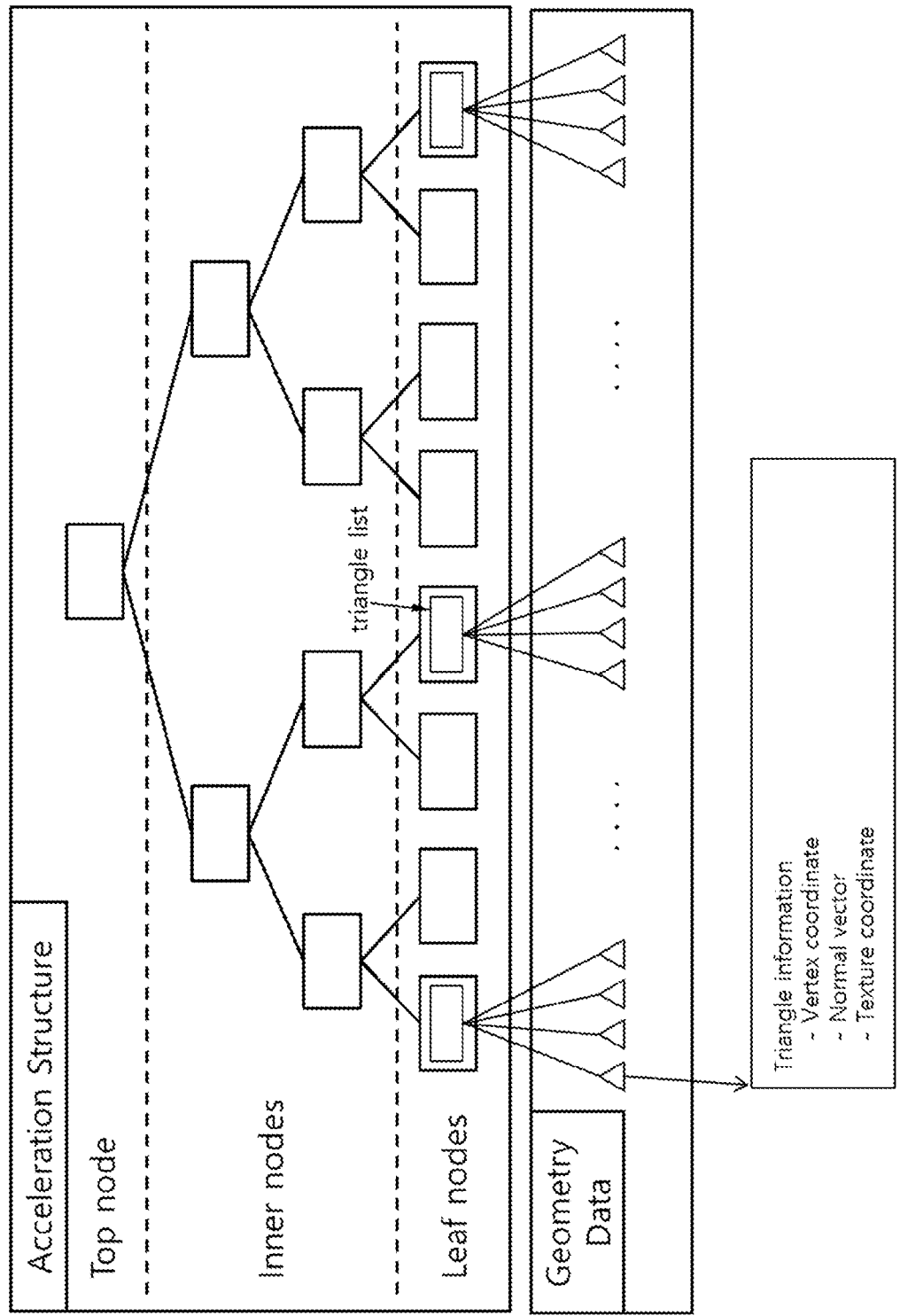
FIG. 3 is a diagram illustrating an acceleration structure and geometry data used in the process of ray tracing.

FIG. 3 is a diagram illustrating the acceleration structure and geometry data used in the process of ray tracing.

Referring to FIG. 3, the acceleration structure (AS) may include the K-dimensional tree (kd-tree) or a bounding volume hierarchy (BVH) generally used in ray tracing, and FIG. 3 shows an example of the acceleration structure implemented as the kd-tree.

The kd-tree is a kind of spatial partitioning tree and may be used for the ray-triangle intersection test. The kd-tree may include a top node, inner nodes, and leaf nodes, and the leaf nodes may include the triangle lists for pointing to at least one piece of triangle information included in the geometry data. In an embodiment, when the triangle information included in the geometry data is implemented as an array, the triangle lists included in the leaf nodes may correspond to the array indexes. Meanwhile, the top node may correspond to the root of the tree.

Figure 4:
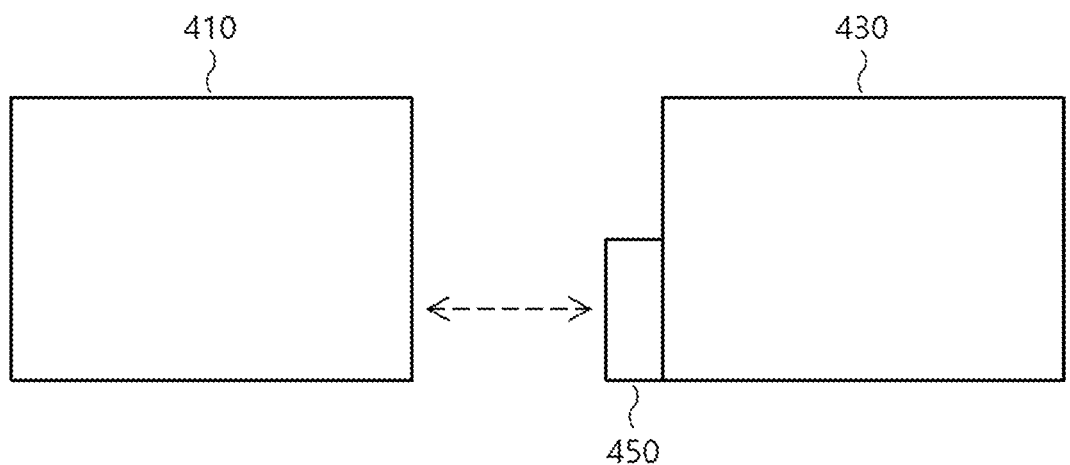
FIG. 4 is a diagram illustrating a multichip ray tracing system according to one embodiment of the present disclosure.

FIG. 4 is a diagram illustrating a multichip ray tracing system according to one embodiment of the present disclosure.

Referring to FIG. 4, the multichip ray tracing system 400 may include a host PC 410, the multichip ray tracing device 430, and a PCI module 450.

The host PC 410 may be a computing device that generates a 3D scene. For example, the host PC 410 may execute a program for outputting 3D graphics and may interwork with a graphic processing unit (GPU) to render a 3D scene according to the operation of the program. In this case, the GPU may correspond to the multichip ray tracing device 430. In other words, the host PC 410 may be implemented to operate in connection with the multichip ray tracing device 430.

In particular, the host PC 410 may generate the acceleration structure (e.g., the static and dynamic acceleration structures) related to the scene in the process of rendering the 3D scene and transmit it to the multichip ray tracing device 430. In this case, the multichip ray tracing device 430 may perform a rendering operation on the 3D scene based on the acceleration structure in conjunction with the host PC 410. Here, data exchange between the host PC 410 and the multichip ray tracing device 430 may be performed through the PCI module 450.

The PCI module 450 may be a bus interface (I/F) for the data exchange between the host PC 410 and the multichip ray tracing device 430. In FIG. 3, the PCI module 450 is illustrated as a device independent of the multichip ray tracing device 430, but the present disclosure is not limited thereto. For example, the PCI module 450 may be included in the multichip ray tracing device 430 and implemented as one component thereof as needed.

The multichip ray tracing device 430 may be a computing device capable of performing the method for multichip ray tracing according to the present disclosure. In particular, the multichip ray tracing device 430 may be implemented as a device that exclusively performs the process of ray tracing for rendering a 3D scene and may correspond to the GPU. Accordingly, the multichip ray tracing device 430 may operate in conjunction with the host PC 410 and may be connected to the host PC 410 through a network.

In an embodiment, the multichip ray tracing device 430 may be implemented to include a ray tracing core. Here, the ray tracing core may be a dedicated processor for performing the process of ray tracing. In addition, the multichip ray tracing device 430 may include at least one system memory and a buffer for the operation of the ray tracing core and may include an internal bus (BUS) for communication between its components.

In addition, the multichip ray tracing device 430 may be implemented including a plurality of ray tracing cores, and, in this case, each ray tracing core may be implemented in the form of a chip to form an independent module. That is, the multichip ray tracing device 430 may be implemented including multiple chips and may process the process of ray tracing in parallel according to interworking between the multiple chips.

Figure 5:
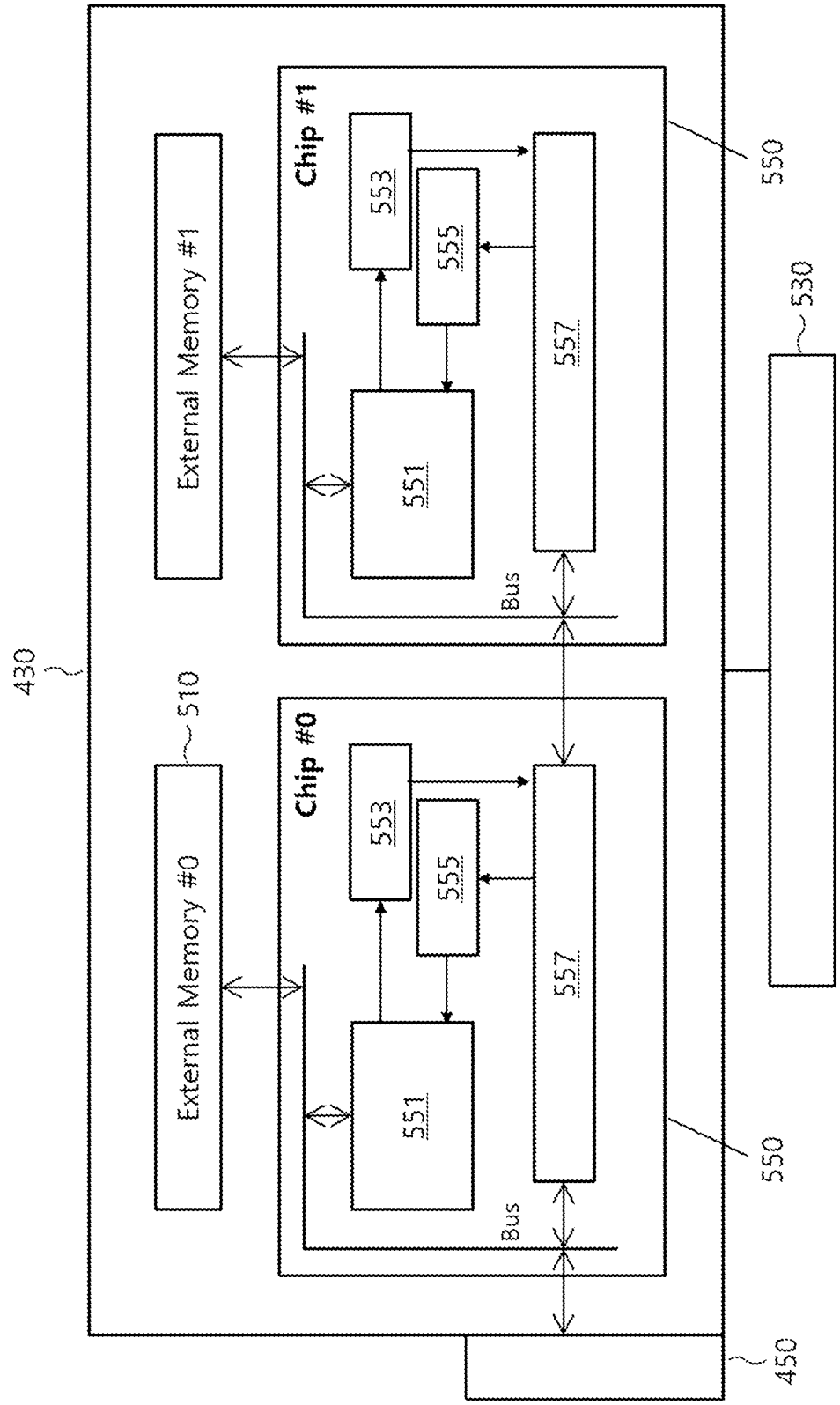
FIG. 5 is a diagram illustrating the multichip ray tracing device in FIG. 4.

FIG. 5 is a diagram illustrating the multichip ray tracing device in FIG. 4.

Referring to FIG. 5, the multichip ray tracing device 430 may be implemented including the multiple chips and each of the chips may include the ray tracing core. That is, the multichip ray tracing device 430 may include a plurality of memory units 510, an acceleration structure division processing unit 530, and a plurality of ray tracing core units 550.

Each of the memory units 510 may be an external memory and may be implemented to be exclusively connected to each chip. For example, referring to FIG. 5, a first memory unit (External Memory #0) may be connected to a first ray tracing core unit (Chip #0), and a second memory unit (External Memory #1) may be connected to a second ray tracing core unit (Chip #1). In addition, the memory units 510 may exchange data with the ray tracing core units 550 through the buses.

Meanwhile, in this specification, the operation according to the present disclosure will be described on the assumption that the two memory units 510 and the two ray tracing core units 550 are connected, but the present disclosure is not limited thereto. For example, it is possible that the operation according to the present disclosure is expanded and applied to the plurality of memory units 510 and the corresponding ray tracing core units 550.

The acceleration structure division processing unit 530 may divide the acceleration structure (AS) into a plurality of divided acceleration structures and store each of the divided acceleration structures in a corresponding memory unit among the plurality of memory units 510. In other words, the parts generated by the division of the acceleration structure may correspond to the divided acceleration structures. The acceleration structure division processing unit 530 may operate in conjunction with the host PC 410 and may process the operation of dividing the acceleration structure according to the operation of the host PC 410 and storing the divided acceleration structures in each corresponding memory unit 510. In addition, the acceleration structure division processing unit 530 may perform the operation of only receiving division information from the host PC 410 to divide the information and then store it in the memory unit 510 without performing the dividing operation. As described above, there may exist various embodiments regarding the distribution and processing of mutually independent operations according to interworking with the host PC 410.

In the meantime, in FIG. 5, the acceleration structure division processing unit 530 is illustrated as a module independent of the multichip ray tracing device 430, but the present disclosure is not limited thereto. For example, the acceleration structure division processing unit 530 may be included in the multichip ray tracing device 430 and implemented as one component thereof as needed.

In an embodiment, the acceleration structure division processing unit 530 may determine a workload rate of each of the plurality of ray tracing core units 550 and may divide the acceleration structure while sharing at least a root data node based on the workload rate. The acceleration structure division processing unit 530 may basically divide the acceleration structure generated corresponding to a 3D scene of the current frame based on the root data node. That is, the division result for child nodes may be subject to the division result of the root data node.

Alternatively, the acceleration structure division processing unit 530 may divide the acceleration structure by applying a predetermined criterion. For example, the acceleration structure division processing unit 530 may divide the acceleration structure according to the workload rate of each of the plurality of ray tracing core units 550. The divided acceleration structures generated by the division may be independently assigned to each of the ray tracing core units 550, and the acceleration structure division processing unit 530 may calculate the workload rate between the plurality of ray tracing core units 550 by means of the workload collected from the ray tracing core units 550 based on the division time. Thereafter, the acceleration structure division processing unit 530 may divide the acceleration structure to correspond to the workload rate. For example, each of the divided acceleration structures may include as many nodes as the number corresponding to the workload rate and may include a search complexity corresponding to the workload rate.

Meanwhile, the workload collected from the ray tracing core units 550 may correspond to the workload of a previous iteration step and may be calculated by summing the workloads in predetermined iteration steps.

In addition, according to a type of the tree or application criteria, the division of the acceleration structure may be performed in various forms, and, as a result of the division, the chips may share an upper node resulting from the division. In this case, the mutually shared nodes may include a starting node corresponding to a division starting point and parent nodes existing on a path from the starting node to the root node. This will be described in more detail with reference to FIG. 6B.

The plurality of ray tracing core units 550 may be independently connected to the plurality of memory units 510, and each of the plurality of ray tracing core units 550 may operate an internal ray tracing (Internal RT) operation for a corresponding divided acceleration structure. Here, the internal ray tracing operation may be a ray tracing operation performed inside a chip for each chip, and an external ray tracing operation may be a ray tracing operation performed outside the chip.

In addition, the ray tracing core unit 550 may transmit corresponding ray information to a corresponding ray tracing core unit to perform the external ray tracing (External RT) operation when attempting to access a data node that is not in a corresponding divided acceleration structure in the process of the internal ray tracing operation. For ray tracing on a 3D scene, it may be necessary to search all the acceleration structures corresponding to the scene. When some searches are performed independently within each chip due to the division of the acceleration structure, access to data nodes allocated to other chips may be required to process the remaining searches. In this case, the ray tracing core unit 550 may transmit related ray information so that the search for the divided acceleration structures allocated to other chips can be performed by each corresponding chip, and the transmitted ray information may include ray coordinates, i.e., the positions of pixels.

In an embodiment, each of the plurality of ray tracing core units 550 may include a ray tracing core 551 that processes the internal ray tracing operation and a ray output buffer 553 that stores corresponding ray information in the process of the internal ray tracing operation. For example, as shown in FIG. 5, each of the plurality of ray tracing core units 550 may correspond to Chip #0 or Chip #1. The ray tracing core 551 may perform ray tracing using a divided acceleration structure stored in an external memory within a corresponding chip. Particularly, when the ray tracing core 551 requires access to data nodes of divided acceleration structures allocated to other chips in the process of the internal ray tracing operation for a divided acceleration structure, it may store the current ray information in the ray output buffer 553 in order to transmit it to other chips.

In an embodiment, each of the plurality of ray tracing core units 550 may further include a ray input buffer 555 that stores corresponding ray information received from a corresponding ray tracing core unit 550 in the process of the external ray tracing operation. That is, each of the plurality of ray tracing core units 550 may independently perform the internal ray tracing operation through an internal ray tracing core 551 based on a divided acceleration structure allocated thereto. In addition, when receiving a request for the external ray tracing operation from other chips, each of the plurality of ray tracing core units 550 may also receive ray information related to the request and store it in the ray input buffer 555. Thereafter, the ray information stored in the ray input buffer 555 may be transferred to the ray tracing core 551 and utilized in the process of the external ray tracing operation.

In an embodiment, each of the plurality of ray tracing core units 550 may further include a data transfer unit 557 that reads corresponding ray information from the ray output buffer 553 for the process of the external ray tracing operation and transmits it to the ray input buffer 555 in a corresponding ray tracing core unit 550. In other words, the data transfer unit 557 may perform data transmission between the ray tracing core units 550. For example, referring to FIG. 5, when the external ray tracing operation is required for a first chip (Chip #0) to access a data node of a divided acceleration structure stored in a second chip (Chip #1), the first chip (Chip #0) may transmit the ray information stored in the ray output buffer 553 to the ray input buffer 555 of the second chip (Chip #1) through the data transfer unit 557. The second chip (Chip #1) may receive the ray information from the first chip (Chip #0) through the data transfer unit 557 and store it in the ray input buffer 555.

In an embodiment, each of the plurality of ray tracing core units 550 may be exclusively connected to one of the plurality of memory units 510 and may wait to see whether the external ray tracing operation is completed when corresponding ray information is transmitted to a corresponding ray tracing core unit 550. Each of the plurality of ray tracing core units 550 may independently perform the internal ray tracing operation, and may stop the internal ray tracing operation and wait until the external ray tracing operation in other chips is completed when requesting the external ray tracing operation from other chips.

In an embodiment, each of the plurality of ray tracing core units 550 may continue the internal ray tracing operation when the external ray tracing operation is completed. That is, each of the plurality of ray tracing core units 550 may continue the interrupted internal ray tracing operation when the requested external ray tracing operation from other chips is completed, and may receive a result of the external ray tracing operation and utilize it for the internal ray tracing operation as needed.

Figure 6A:
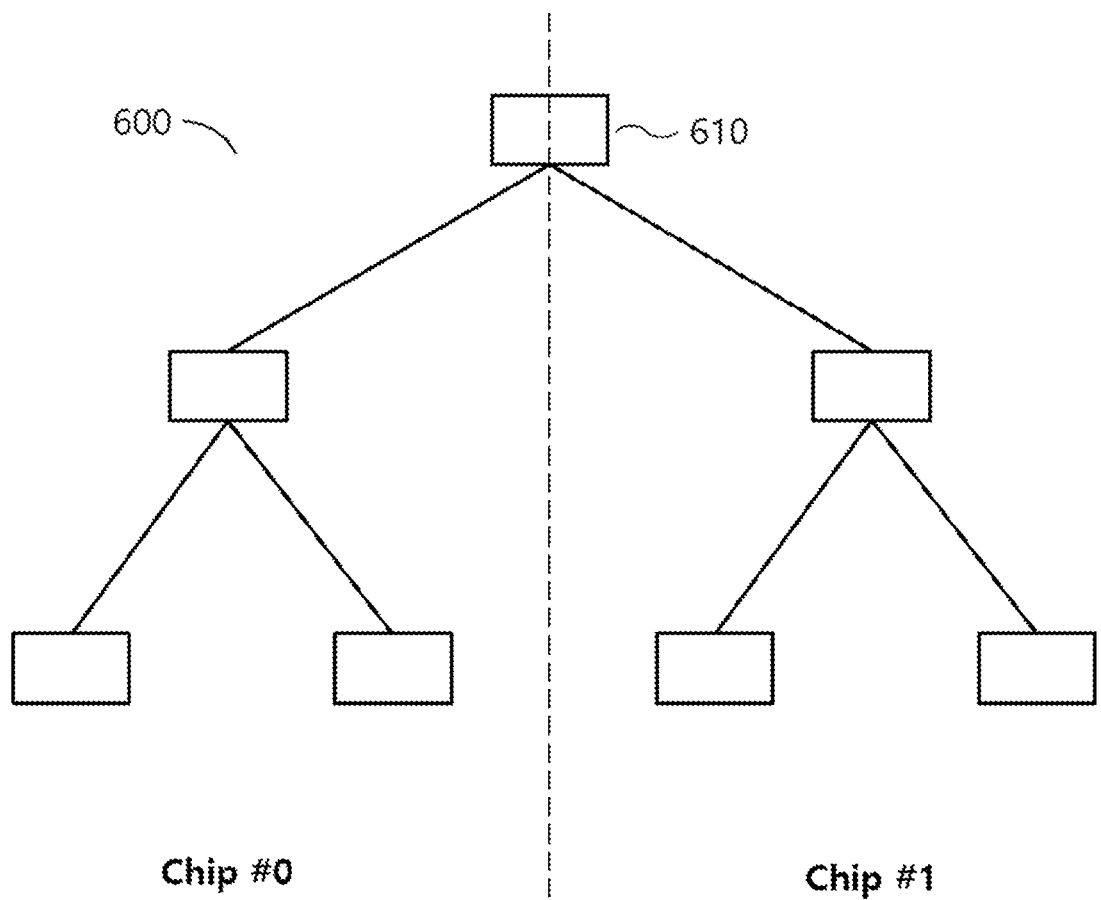
FIGS. 6A and 6B are diagrams illustrating the division of the acceleration structure according to the present disclosure.
Figure 6B:
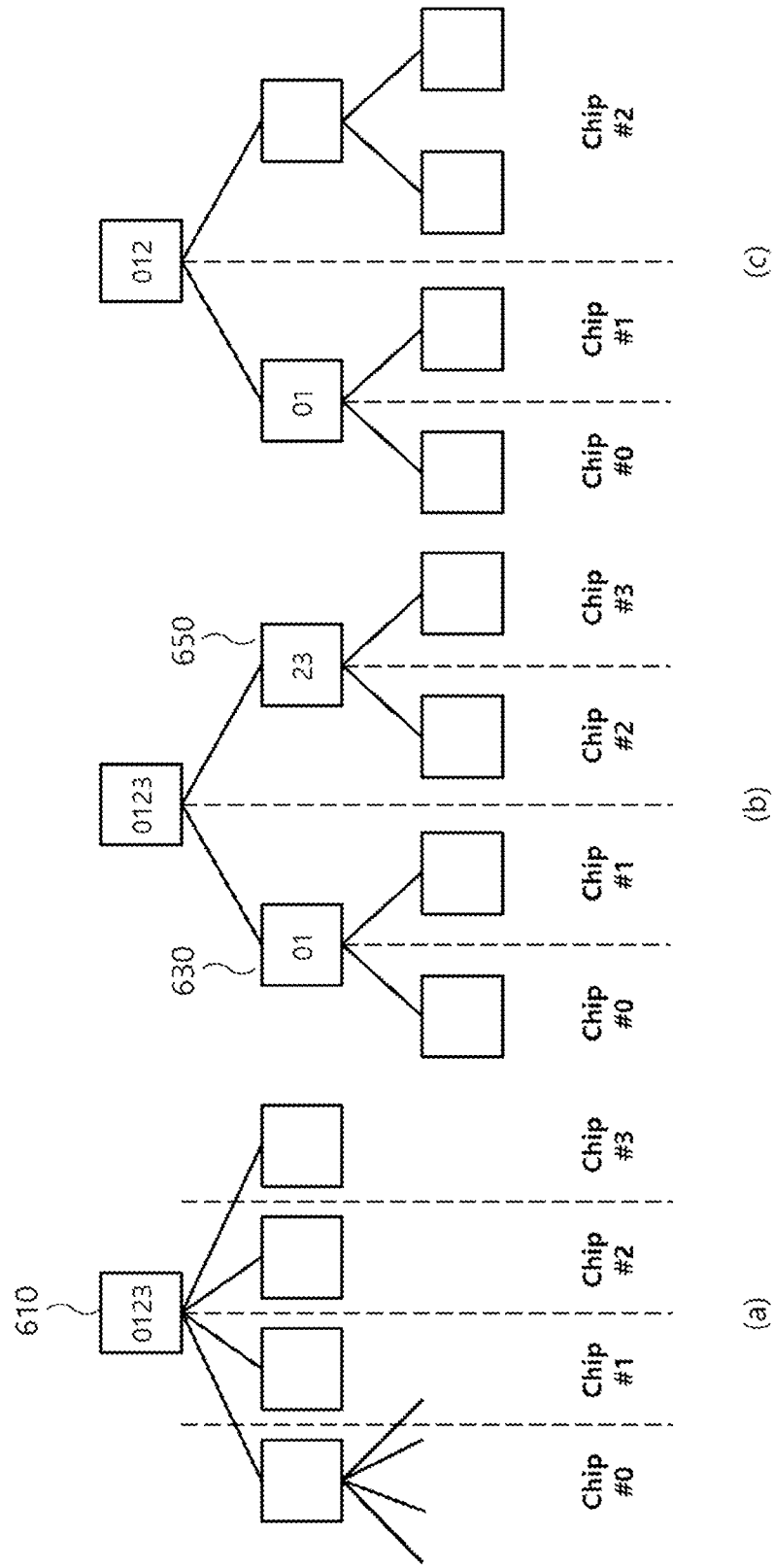

FIGS. 6A and 6B are diagrams illustrating the division of the acceleration structure according to the present disclosure.

Referring to FIG. 6A, the acceleration structure (AS) 600 used for ray tracing may be implemented in the form of a tree. That is, the acceleration structure (AS) 600 may include one root data node 610, and the root data node 610 may include at least two child data nodes. As shown in FIG. 6A, each data node may include two child data nodes.

The multichip ray tracing device 430 may divide the acceleration structure into the plurality of divided acceleration structures based on the root data node 610. Referring to FIG. 6, the acceleration structure 600 may be divided into two divided acceleration structures each including child data nodes based on the root data node 610, and each divided acceleration structure may be stored in an external memory connected to a different chip (Chip #0 and Chip #1).

Referring to FIG. 6B, figure (a) shows an embodiment of division into four for a quaternary tree, figure (b) shows an embodiment of division into four for a binary tree, and figure (c) shows an embodiment of division into three for a binary tree. More specifically, referring to figure (a), the quaternary tree may be divided into four with the root data node 610 as a starting node, and the divided acceleration structures may be stored separately in each chip (i.e., Chip #0 to Chip #3). In addition, each chip may share the root data node 610 serving as the starting node.

In addition, referring to figure (b), the binary tree may be divided into four by using the root data node 610 and two child data nodes 630 and 650 as starting nodes. In this case, the acceleration structures divided by using a first child data node 630 as the starting node may be stored in a first chip (Chip #0) and a second chip (Chip #1), respectively, and the divided acceleration structures may thus share the first child data node 630 serving as the starting node and the root data node 610 serving as a parent node thereof. The acceleration structures divided by using a second child data node 650 as the starting node may be stored in a third chip (Chip #2) and a fourth chip (Chip #3), respectively, and the divided acceleration structures may thus share the second child data node 650 serving as the starting node and the root data node 610 serving as the parent node thereof.

Meanwhile, referring to figure (c), the binary tree may be divided into three by using the root data node 610 and one child data node 630 as starting nodes. In this case, the acceleration structures divided by using a first child data node 630 as the starting node may be stored in a first chip (Chip #0) and a second chip (Chip #1), respectively, and the divided acceleration structures may thus share the first child data node 630 serving as the starting node and the root data node 610 serving as the parent node thereof. In particular, the remaining acceleration structure divided by using the root data node 610 as the starting node may be stored in a third chip, and the divided acceleration structure may thus share the root data node 610 serving as the starting node.

FIG. 7 is a flowchart illustrating a method for multichip ray tracing according to the present disclosure.

Referring to FIG. 7, the multichip ray tracing device 430 may include the plurality of ray tracing core units 550 and may be implemented including the memory units 510 independently connected to each ray tracing core unit 550. The multichip ray tracing device 430 may divide the acceleration structure (AS) related to a 3D scene according to the number of the ray tracing core units 550 by interworking with the host PC 410 and may store each of the divided acceleration structures in the memory unit 510 of each of the ray tracing core units 550 at step 710.

Thereafter, the multichip ray tracing device 430 may perform the internal ray tracing for the divided acceleration structure through each of the ray tracing core units 550 at step 720. When the multichip ray tracing device 430 requires access to a data node of a divided acceleration structure stored in other ray tracing core units 550 in the process of the internal ray tracing, it may request the external ray tracing from other ray tracing core units 550.

To this end, the multichip ray tracing device 430 may store the current ray information in the ray output buffer 553 in the process of the internal ray tracing operation at step 730 and may transmit the ray information to other ray tracing core units 550 through the data transfer unit 557 at step 740.

Another ray tracing core unit 550 that has received the ray information may store the information in the ray input buffer 555 at step 750 and may perform the external ray tracing operation on the ray information through the ray tracing core 551 at step 760.

As such, the multichip ray tracing device 430 may control the internal ray tracing operation in each chip and the external ray tracing operation between the chips, and may return to the initial chip through the ray output buffer 553 when ray tracing is terminated in an external chip for each ray so that the ray tracing operation on a 3D scene is efficiently performed.

While this disclosure has been described in connection with what is presently considered to be practical exemplary embodiments, it is to be understood that the disclosure is not limited to the disclosed embodiments but, on the contrary, is intended to cover various modifications and equivalent arrangements included within the spirit and scope of the appended claims.

What is claimed is:
1. A multichip ray tracing device comprising:
a plurality of memory units;
an acceleration structure division processing unit that divides an acceleration structure (AS) into a plurality of divided acceleration structures and stores each of the plurality of divided acceleration structures in a corresponding memory unit among the plurality of memory units; and a plurality of ray tracing core units connected to the plurality of memory units, wherein each of the plurality of ray tracing core units performs an internal ray tracing (Internal RT) operation for a corresponding divided acceleration structure and transmits corresponding ray information to a corresponding ray tracing core unit to perform an external ray tracing (External RT) operation when attempting to access a data node that is not in the corresponding divided acceleration structure in the process of the internal ray tracing operation, wherein the acceleration structure division processing unit determines a workload rate of each of the plurality of ray tracing core units and divides the acceleration structure based on the workload rate while sharing at least a root data node.

2. The multichip ray tracing device of claim 1, wherein each of the plurality of ray tracing core units includes a ray tracing core that processes the internal ray tracing operation and a ray output buffer that stores the corresponding ray information in the process of the internal ray tracing operation.

3. The multichip ray tracing device of claim 2, wherein each of the plurality of ray tracing core units further includes a ray input buffer for storing the corresponding ray information received from the corresponding ray tracing core unit in the process of the external ray tracing operation.

4. The multichip ray tracing device of claim 3, wherein each of the plurality of ray tracing core units further includes a data transfer unit that reads the corresponding ray information from the ray output buffer and transmits it to the ray input buffer in the corresponding ray tracing core unit for the process of the external ray tracing operation.

5. The multichip ray tracing device of claim 1, wherein each of the plurality of ray tracing core units is exclusively connected to one of the plurality of memory units and waits to see whether the external ray tracing operation is completed when the corresponding ray information is transmitted to the corresponding ray tracing core unit.

6. The multichip ray tracing device of claim 5, wherein each of the plurality of ray tracing core units continues the internal ray tracing operation when the external ray tracing operation is completed.

7. A method for multichip ray tracing comprising:

the step of preparing a plurality of memory units;

the step of processing the division of an acceleration structure, wherein the acceleration structure (AS) is divided into a plurality of divided acceleration structures and each of the plurality of divided acceleration structures is stored in a corresponding memory unit among the plurality of memory units; and the step of ray tracing performed by a plurality of ray tracing core units connected to the plurality of memory units, wherein each of the plurality of ray tracing core units performs an internal ray tracing (Internal RT) operation for a corresponding divided acceleration structure and transmits corresponding ray information to a corresponding ray tracing core unit to perform an external ray tracing (External RT) operation when attempting to access a data node that is not in the corresponding divided acceleration structure in the process of the internal ray tracing operation, wherein the method further comprises determining a workload rate of each of the plurality of ray tracing core units and dividing the acceleration structure based on the workload rate while sharing at least a root data node.

* * * * *